(12) United States Patent
Jacobs et al.

(10) Patent No.: US 8,298,419 B2
(45) Date of Patent: Oct. 30, 2012

(54) MULTI FILTER LUBRICANT PURIFICATION SYSTEM

(75) Inventors: William A. Jacobs, Lake Worth, FL (US); Joseph V. Vittoria, Palm Beach, FL (US)

(73) Assignee: Puradyn Filter Technologies, Inc., Boynton Beach, FL (US)

( * ) Notice: Subject to any disclaimer, the term of this patent is extended or adjusted under 35 U.S.C. 154(b) by 399 days.

(21) Appl. No.: 12/732,126

(22) Filed: Mar. 25, 2010

(65) Prior Publication Data

US 2011/0233117 A1 Sep. 29, 2011

(51) Int. Cl.
*B01D 29/52* (2006.01)

(52) U.S. Cl. ............... 210/232; 210/323.1; 210/341; 210/345

(58) Field of Classification Search .......... 210/167.04, 210/167.05, 253, 323.2, 323.1, 340, 341, 210/345, 346, 347, 232
See application file for complete search history.

(56) References Cited

U.S. PATENT DOCUMENTS

| 4,369,110 A | 1/1983 | Picek |
| 4,419,234 A | 12/1983 | Miller et al. |
| 4,587,017 A | 5/1986 | Christophe et al. |
| 4,615,800 A * | 10/1986 | Stifelman et al. ............ 210/132 |
| 4,943,352 A | 7/1990 | Lefebvre et al. |
| 6,485,636 B1 * | 11/2002 | Moss ........................ 210/117 |
| 8,029,672 B2 * | 10/2011 | Baumann et al. ............ 210/340 |
| 2002/0023863 A1 | 2/2002 | Binder et al. |

* cited by examiner

*Primary Examiner* — Terry Cecil
(74) *Attorney, Agent, or Firm* — Allen D. Hertz, P.A.; Allen D. Hertz

(57) ABSTRACT

A lubricant reclamation configuration includes a series of fluid inlets that distribute the fluid to a series of parallel arrangement of individual filter assemblies. A filter control valve assembly is assembled between the distribution manifold and each respective filter assembly individually controlling fluid flow between the distribution manifold and each respective filter assembly. The filter assembly processes the fluid. The processed fluid is collected and retuned to the system via a series of collection channels. The distribution manifold is preferably fabricated of a series of plates.

18 Claims, 11 Drawing Sheets

MULTI FILTER LUBRICANT PURIFICATION SYSTEM

FIELD OF THE INVENTION

The present invention relates to an oil reclamation system and more specifically to an oil purification system incorporating a plurality of filters in a parallel relation.

BACKGROUND OF THE INVENTION

Discussion of the Related Art

This invention relates to fluid reclamation and purification devices, which are preferably used in conjunction with engines using lubricating oils or hydraulic systems. More particularly, the present invention provides several unique oil/lubricant treatment means creating an unique system for reconditioning.

The majority of the fluid reclamation devices utilize a filtration assembly integrated into a single filter housing. The fluid flows into the housing, through the filtration assembly, and exists the housing. If the single filter were to become ineffective, the quality of the lubricant rapidly declines.

Oil filters are provided in a variety of form factors and materials. Common filters comprise a filtering medium disposed within a canister and sealed via a top member. A mechanical interface, such as a threaded interface, and fluid transfer means, such as an oil inlet and an oil outlet, are integrated into the top member. The filtering materials can be a paper product, a synthetic filtering material, and the like. The filter is designed whereby the fluid flows in through a series of apertures provided about a perimeter of a fluid passage surface, through the filtration medium(s), and redirected exiting through a fluid exit port centrally located through the fluid passage surface.

Oil reclamation devices can additionally include soluble oil additives for enriching the oil over a period of time. The additives are positioned within the filter in a section between the particle filtering material and a felt pad. The additives are placed to contact the oil and formulated to dissolve over a period of time.

Filters are known to include a plurality of filters within the filter enclosure. One such example is taught by Miller, et al. (U.S. Pat. No. 4,419,234), wherein the filter comprises a series of filter cartridges. Each filter cartridge comprises an inlet flow port at a first end and an exit flow port located at the opposite end of the filter cartridge. The service person needs to temporarily bypass or halt the fluid flow through the entire filter in order to change any or all of the cartridges. The filter comprises a single inlet port and a single exit port. The device further has no means for selectively controlling flow through any of the filter cartridges.

Thus, what is desired is a lubrication reclamation system providing a means for maintaining lubricant conditioning when at least one filter is no longer effective. Additionally, a system is desired which allows an exchange of one filter while the fluid continues to circulate through other filters.

SUMMARY OF THE INVENTION

The present invention is directed to a lubricant reclamation system comprising a plurality of filters arranged in a parallel filtration configuration. Each filter can be replaced without any interruption to the application of the balance of the filters.

In a first aspect of the present invention, a filter arrangement comprising a series of filter assemblies, each filter assembly having:
  a filter enclosure defined by a fluid encapsulating surface and a filter coupling surface,
  a filtration medium disposed within the filter enclosure,
  at least one filter entrance orifice and a filter discharge orifice provided through the filter coupling surface,
  a filter flow path provided from the at least one filter entrance orifice, through the filtration medium, and exiting through the filter discharge orifice, and
  a filter coupling interface providing mechanical attachment and fluid communication between the filter coupling surface and another object;
a fluid distribution assembly having:
  a series of filter receiving couplers, the number of filter receiving couplers are respective to the number of filter assemblies, the filter coupler provide the mating connection interface to the filter coupling interface,
  at least one initial conditioning inlet port,
  a series of distribution conduits providing fluid communication between the initial conditioning inlet port and the at least one filter inlet flow port of each filter,
  at least one filter reclamation return port for each filter assembly, and
  a series of reclamation collection conduits providing fluid communication between the series of filter reclamation return ports and a reconditioned fluid collection return port;
wherein the series of filter assemblies are removably attached to a filtration side of the fluid distribution assembly via the filter coupling interface.

While another aspect of the present invention provides a fluid distribution assembly formed by joining a series of plates.

Yet in another aspect, the fluid distribution assembly is formed by joining three plates: an external plate member, an intermediate plate member, and a filter engagement plate member.

Wherein another aspect, the filter engagement plate member comprises a series of filter transfer flow ports in registration with the filter entrance orifice.

Another aspect describes the filter engagement plate member comprises a reconditioned fluid individual return port in registration with the filter discharge orifice.

In another aspect of the present invention, the series of filter transfer flow ports are positioned to surround the filter discharge orifice.

While another aspect, the intermediate plate member comprises a series of intermediate filter transfer flow ports passing therethrough, wherein the intermediate filter transfer flow ports provide fluid communication to the filter transfer flow ports.

Yet another aspect, the external plate member comprises a series of initial conditioning inlet ports passing therethrough, wherein the initial conditioning inlet ports provide fluid communication to the intermediate filter transfer flow ports.

With yet another aspect integrates a filter control valve assembly between the filter engagement plate member and the filter assembly, wherein the filter control valve assembly allows a service person to block any flow to a single filter assembly, remove the filter assembly and replace the filter assembly.

And another aspect integrates a mounting flange about the plate assembly, the mounting flange providing a mounting means for attachment to a pipe.

While another aspect provides a discharge pipe centrally positioned within a source pipe, providing a source fluid flow conduit to each of the filter assemblies and a discharge fluid flow conduit, collecting the reclaimed fluid from each of the filter assemblies.

Yet another aspect directs the flow of the source fluid flow and the discharged reclaimed fluid flow on the same side of the fluid distribution plate assembly.

With another aspect, the series of filter assemblies are positioned within a downstream pipe. The downstream pipe can include a filter service access door. It is preferable that the door open inward, wherein the general fluid pressure ensures the door remains sealed.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which.

Like reference numerals refer to like parts throughout the several views of the drawings.

DETAILED DESCRIPTION OF REPRESENTATIVE EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
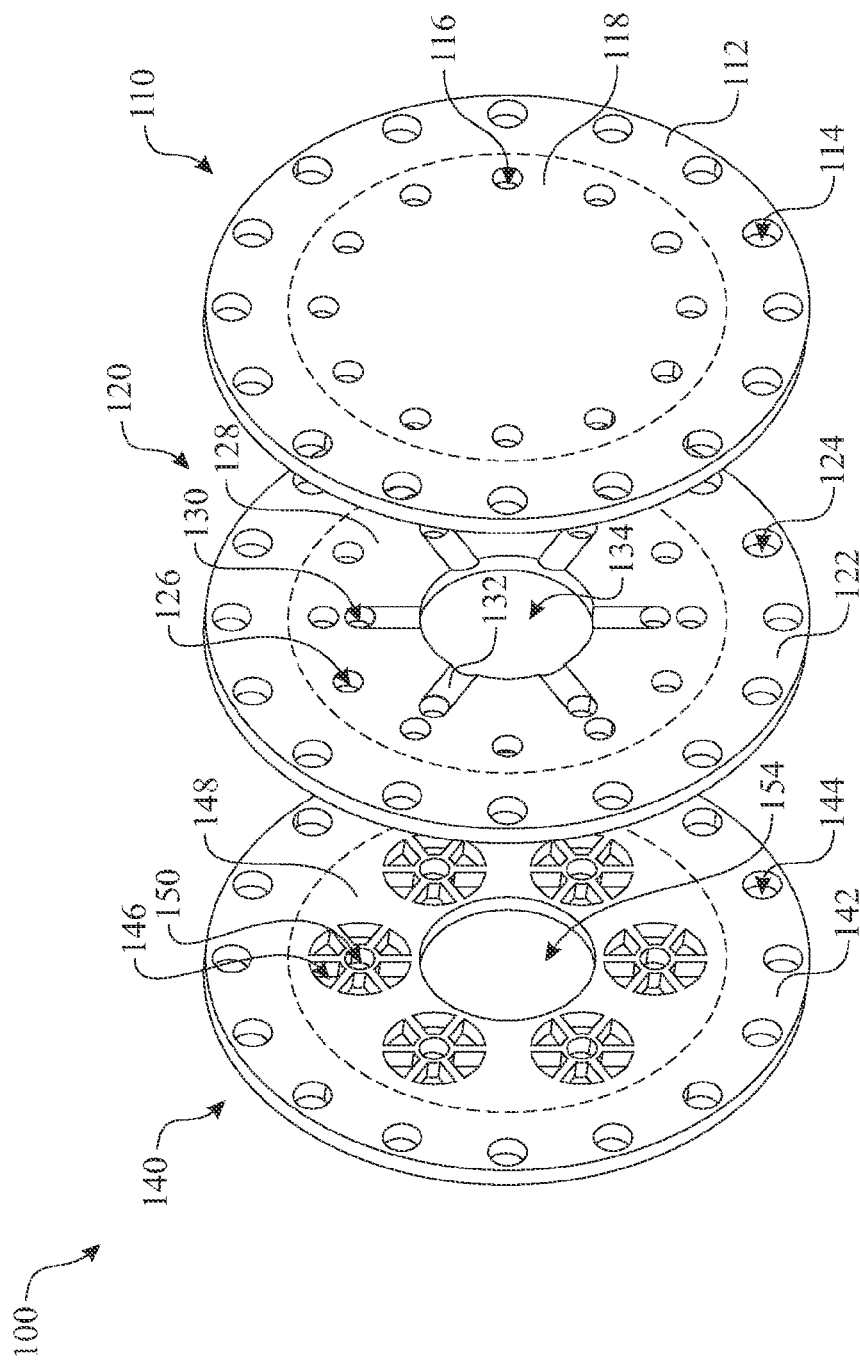
FIG. 1 presents an exploded isometric view of an exemplary fluid distribution plate assembly viewed from a fluid source side.
Figure 2:
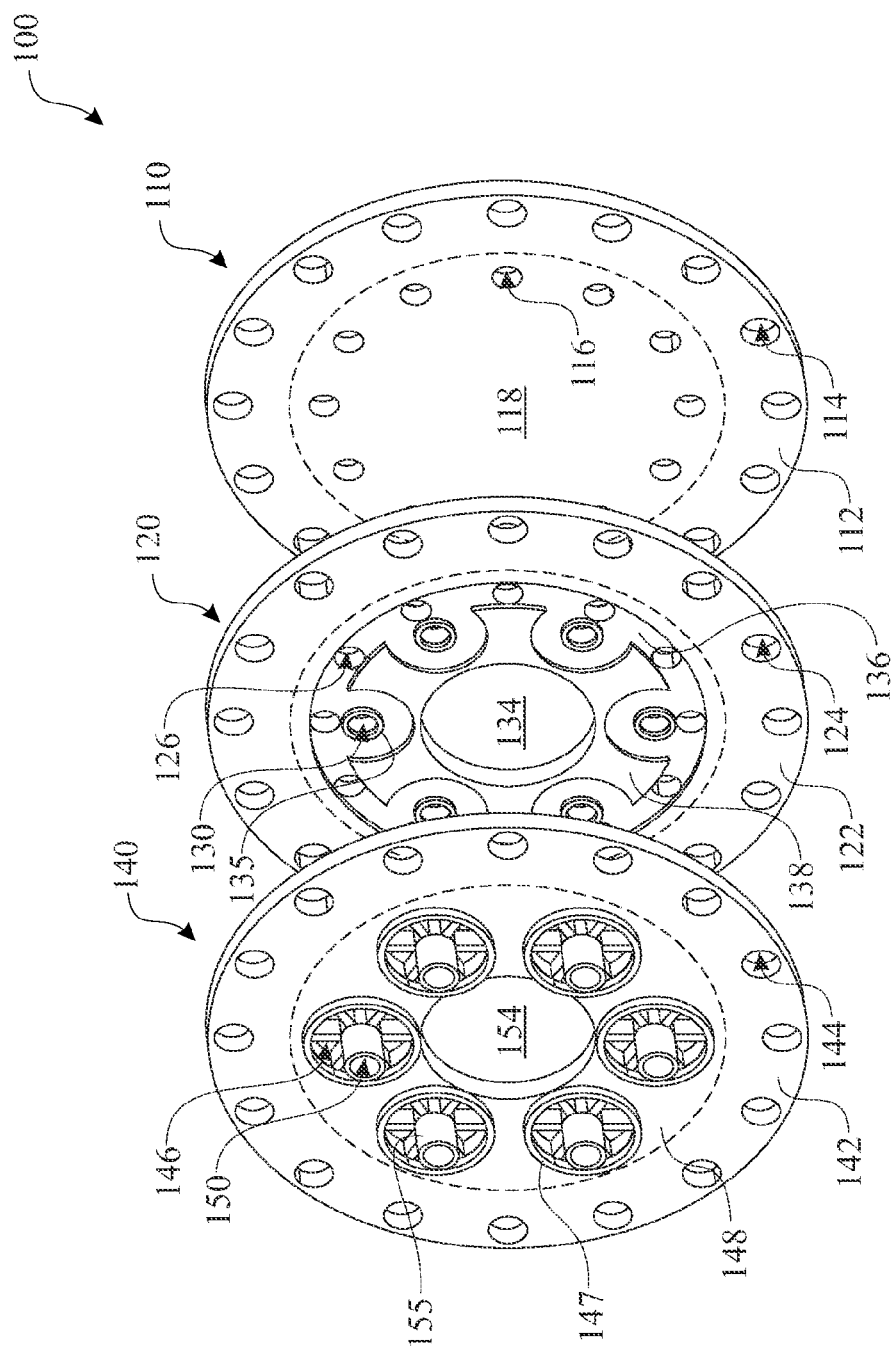
FIG. 2 presents an exploded isometric view of the exemplary fluid distribution plate assembly of FIG. 1, viewed from a fluid filtration side.
Figure 3:
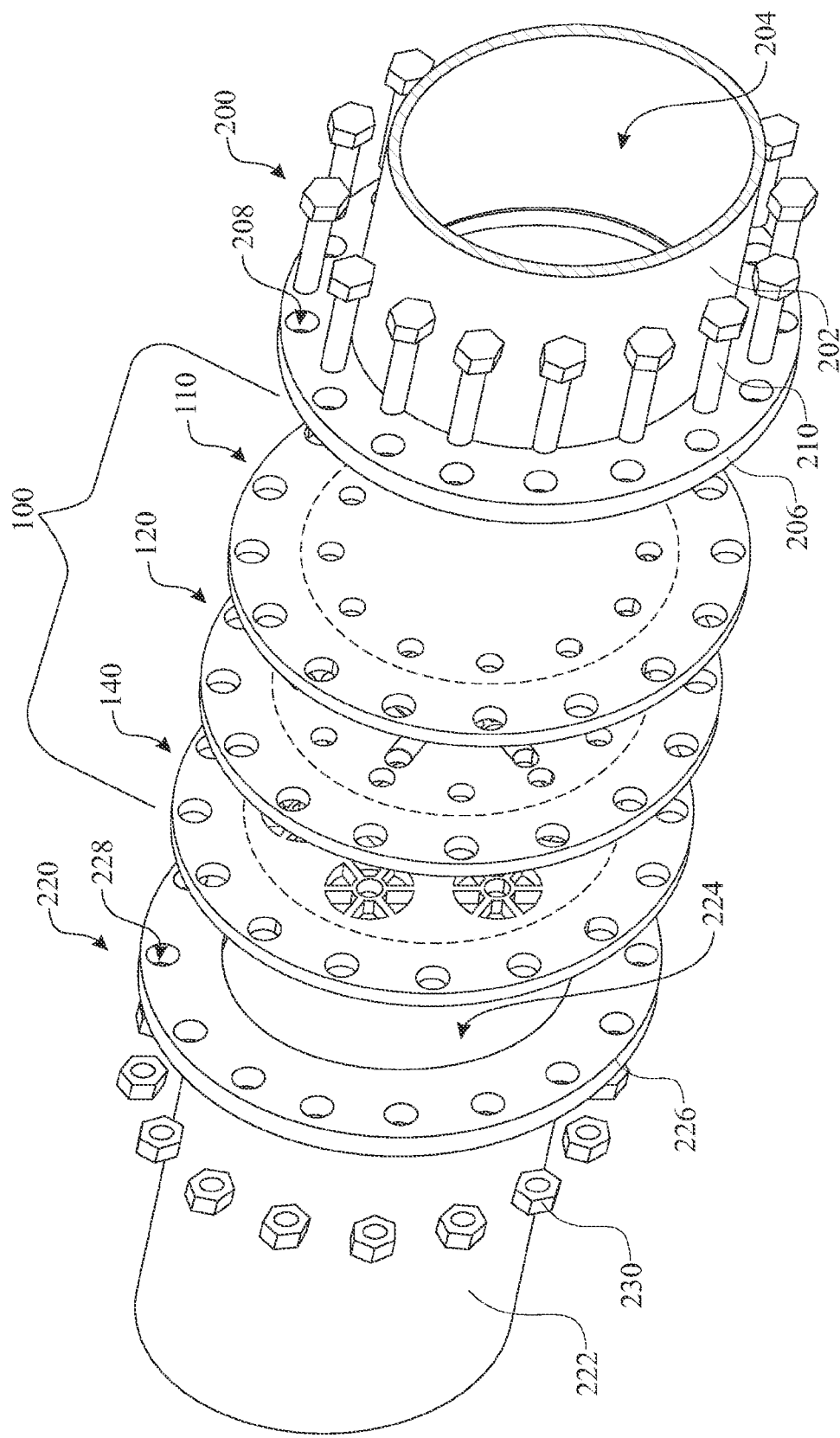
FIG. 3 presents an exploded isometric view of the exemplary fluid distribution plate assembly of FIG. 1 as integrated into a piping system, being viewed from a fluid source side.

An exemplary fluid distribution manifold assembly 100 forms a fluid passage system for feeding lubricant into a plurality of filter assemblies, then collecting the refurbished lubricant to return the fluid into the system as illustrated in FIGS. 1 and 2. An external plate member 110 is positioned on a fluid sourcing side of the fluid distribution manifold assembly 100, with a filter engagement plate member 140 being positioned on a filtration side of the fluid distribution manifold assembly 100, and an intermediate flow control plate 120 is positioned therebetween. The fluid distribution manifold assembly 100 is formed from a machined external plate 112, having a series of initial conditioning inlet ports 116 formed therethrough. The external plate member 110 can include any form factor for assembly, wherein the illustrated exemplary embodiment incorporates a sandwiched flange assembly form factor. A mounting flange is formed on an exterior of a flow management gasket region 118. The intermediate flow control plate 120 is formed from a machined intermediate plate 122, having a series of intermediate filter transfer flow ports 126 machined in registration with the initial conditioning inlet ports 116. The intermediate flow control plate 120 includes a form factor consistent with that of the external plate member 110 for assembly. A mounting flange is formed on an exterior of a flow management gasket region 128. The initial conditioning inlet port 116 and intermediate filter transfer flow port 126 are provided to feed the used lubricant into the series of filter assemblies.

The filter engagement plate member 140 is formed from a machined internal plate 142, having a series of filter transfer flow ports 146 formed therethrough. Each filter transfer flow port 146 is provided in a pattern to disseminate fluid from the source into a fluid receiving system of a filter assembly. A used fluid dispersion channel 136 is shaped within the filtration side of the intermediate flow control plate 120. The fluid dispersion channel 136 is a recess within the intermediate flow control plate 120. The relief from the recess forms a flow gasket 138. The series of intermediate filter transfer flow port 126 are in fluid communication with the used fluid dispersion channel 136, conveying the source fluid into the used fluid dispersion channel 136. The used fluid dispersion channel 136 is in registration with the series of filter transfer flow port 146 to transfer the fluid from a distribution manifold formed by the used fluid dispersion channel 136 and a planar surface of a flow management gasket region 148. A filter entrance transfer fluid passage seal 147 is formed about the cluster of filter transfer flow ports 146 aiding in distribution and transfer of the fluid from the fluid distribution manifold assembly 100 into the respective filter assembly (300 of FIG. 4) The source fluid continues through each cluster of filter transfer flow ports 146 and into each respective filter assembly 300.

The following describes the post processing, fluid reclamation process. A series of reconditioned fluid individual return port 150 are provided through the machined internal plate 142. The lubricant is processed, and returns to the system initially via the series of reconditioned fluid individual return port 150. A reconditioned fluid collection return passage seal 155 extends from the reconditioned fluid individual return port 150 providing a fluid communication conduit between the respective filter assembly 300 and the fluid distribution manifold assembly 100. A plurality of reconditioned fluid individual return port 130 is provided through the machined intermediate plate 122 to collect and aid in returning processed lubricant to the lubrication system. A reconditioned fluid transfer channel 132 spans between each reconditioned fluid individual return port 130 and a reconditioned fluid collection return port 134. It is preferred that the reconditioned fluid collection return port 134 be centrally located. A reconditioned fluid collection return port 154 is provided through the machined internal plate 142, in fluid communication with the reconditioned fluid collection return port 134. The intermediate flow control plate 120 mates against the flow management gasket region 118 of the external plate member 110 forming a fluid passage between the reconditioned fluid transfer channel 132 and the flow management gasket region 118. The processed fluid flows through the reconditioned fluid individual return port 150, passing through the reconditioned fluid passage seal 135, continuing through the reconditioned fluid individual return port 130, transferring into the reconditioned fluid transfer channel 132, and finally collecting within the reconditioned fluid collection return port 134. The collected fluid returns to the system via the reconditioned fluid collection return port 154.

The fluid distribution manifold assembly 100 is assembled to a fluid conveying system in any of a variety of configurations. A first exemplary configuration is presented in FIGS. 3 through 6. An upstream piping interface flange 200 is fabricated having an upstream pipe flange 206 disposed upon an end of an upstream pipe 202. An upstream pipe interior 204 is formed within the upstream pipe 202. A series of flange mounting aperture 208 are provided in a spatial relationship about the upstream pipe flange 206. The flange mounting aperture 208 is in registration with the plate mounting apertures 114, 124, 144. A downstream piping interface flange 220 is fabricated having a downstream pipe flange 226 disposed upon an end of a downstream pipe 222. A downstream pipe interior 224 is formed within the downstream pipe 222. A series of flange mounting aperture 228 are provided in a spatial relationship about the downstream pipe flange 226. The flange mounting aperture 228 is in registration with the plate mounting apertures 114, 124, 144. In the first exemplary configuration, the fluid distribution manifold assembly 100 is inserted between the upstream pipe flange 206 and the downstream pipe flange 226. The external plate member 110 is positioned against and aligned to an upstream pipe flange 206 of an upstream piping interface flange 200. The filter engagement plate member 140 is positioned against and aligned to a downstream pipe flange 226 of a downstream piping interface flange 220. A plurality of coupling hardware 210 are each inserted flange mounting aperture 208, continuing through the plate mounting apertures 114, 124, 144 and exiting the flange mounting aperture 228. A mating hardware 230 secures the coupling hardware 210 therethrough. A flange pressure gap 207, 227 can be formed about the contacting side of the pipe flange 200, 220 to ensure appropriate pressure is applied to the assembly optimizing a fluid seal.

Figure 8:
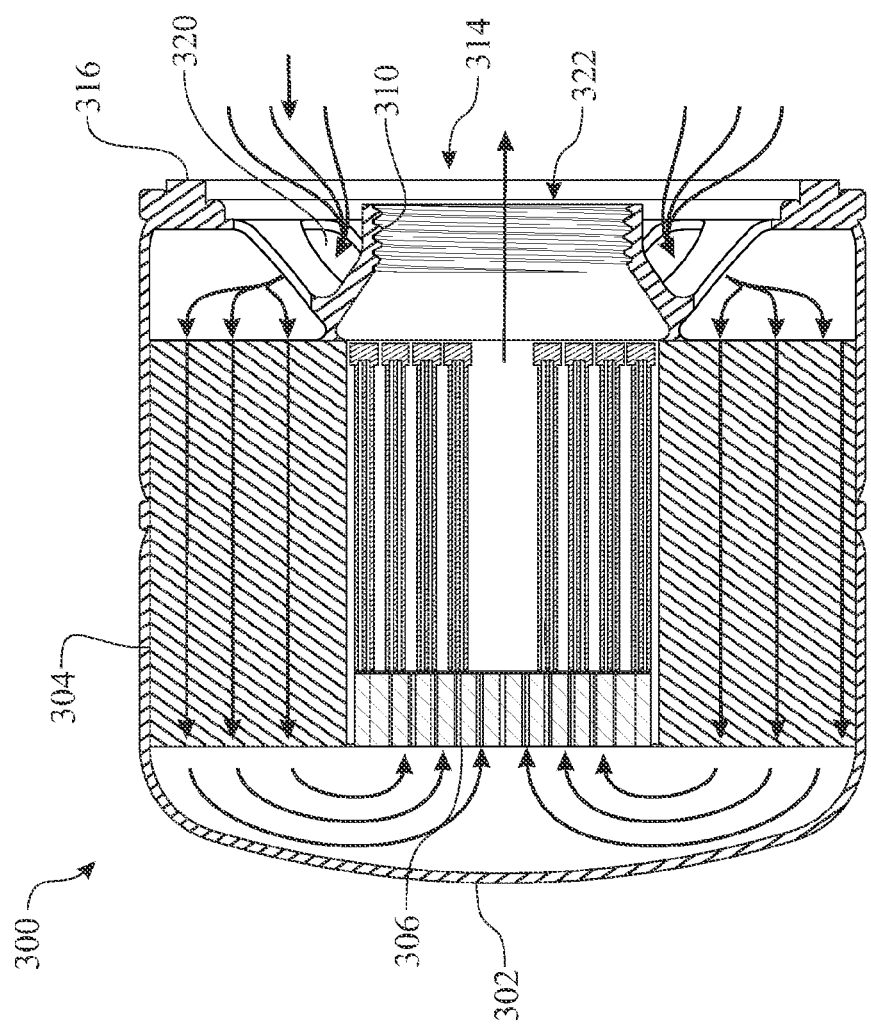
FIG. 8 presents a side sectional view of the fluid distribution assembly integrated into an alternate piping configuration, whereby the filter assemblies are located externally to the discharge piping.
Figure 9:
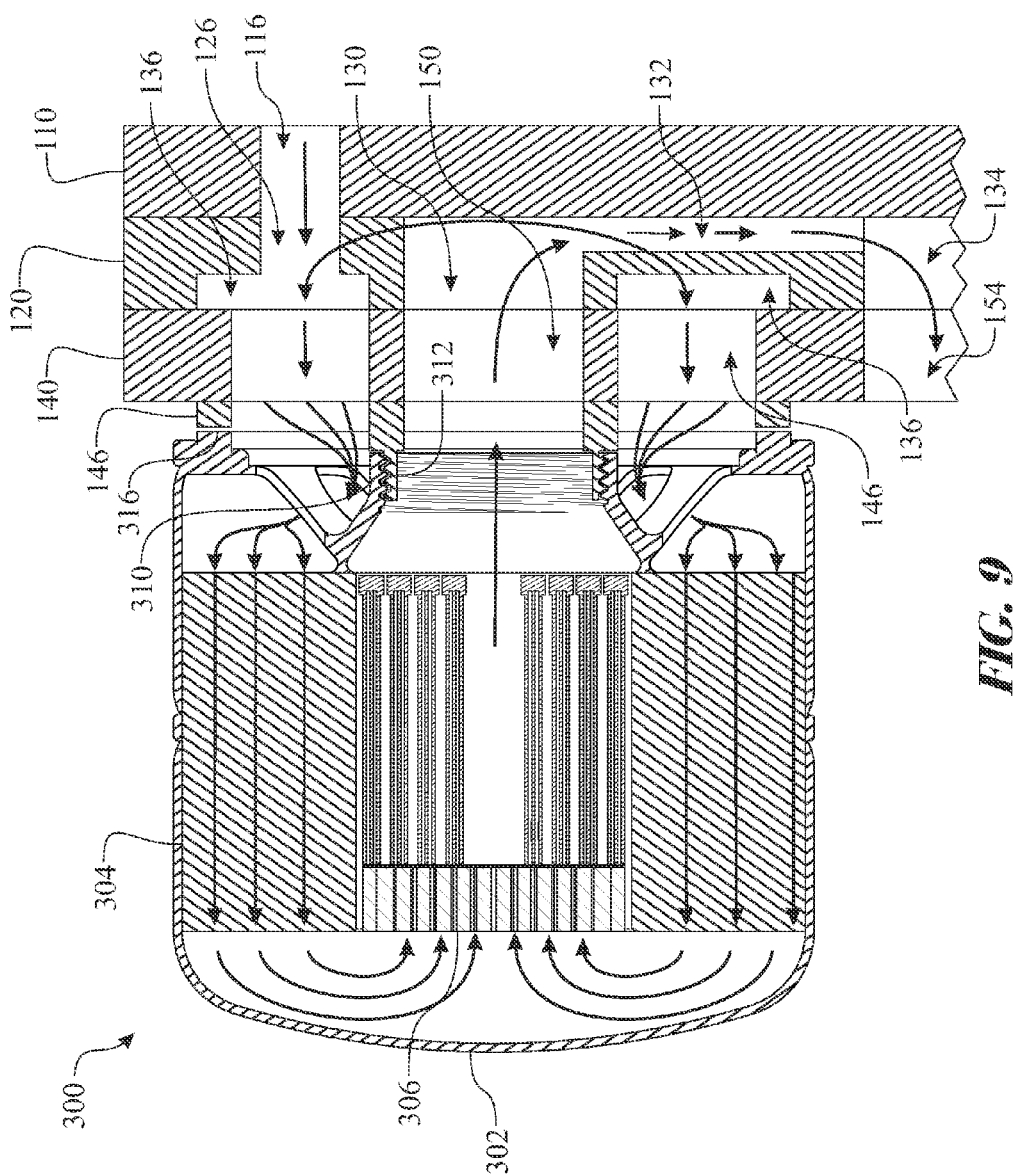
FIG. 9 presents a side sectional view of the exemplary filter assembly.

A series of filter assembly 300 are installed onto the filter engagement plate member 140, each being installed in fluid communication with the respective cluster of filter transfer flow ports 146 and reconditioned fluid individual return port 150. Details of the filter assembly 300 are described in FIGS. 8 through 10. The filter assembly 300 comprises a filter enclosure 302 having a filter coupling surface 314 assembled at one end. The filter coupling surface 314 includes the pertinent interface components, such as a filter coupling interface 310, a filter seal 316, a series of filter fluid entrance orifices 320, and a filter fluid discharge orifice 322. The filter coupling interface 310 removably engages with a filter receiving coupler 312, which extends from the filter engagement plate member 140. The filter seal 316 abuts with a filter transfer flow port 146 forming a peripheral seal between the filter assembly 300 and the fluid distribution manifold assembly 100. A filtration medium 304 is encapsulated within the filter enclosure 302. An optional impregnated material 306 is included; preferably positioned being exposed to the fluid after the fluid is at least partially filtered. The impregnated material 306 introduces a time released additive to the fluid.

Fluid approaches the fluid side of the external plate member 110. The fluid enters the plurality of initial conditioning inlet port 116, passing through to the intermediate filter transfer flow port 126. The fluid continues the used fluid dispersion channel 136, which distributes the fluid to the clusters of filter transfer flow port 146. The fluid is transferred into the filter assembly 300 via the series of filter fluid entrance orifices 320. Upon entry into the filter assembly 300, the fluid begins the filtration process, passing through a series of different filtration mediums of the filtration medium 304. The fluid can optionally having an additive introduced via an impregnated material 306 (or other additive means). The processed fluid then exits the filter assembly 300 via a filter fluid discharge orifice 322 transferring into the fluid distribution manifold assembly 100 through the reconditioned fluid individual return port 150. The reclaimed fluid is collected passing through the reconditioned fluid individual return ports 130 and each respective reconditioned fluid transfer channel 132, collecting into the reconditioned fluid collection return port 134. The fluid is reintroduced into the system from the reconditioned fluid collection return port 134, passing through the reconditioned fluid collection return port 154.

Figure 4:
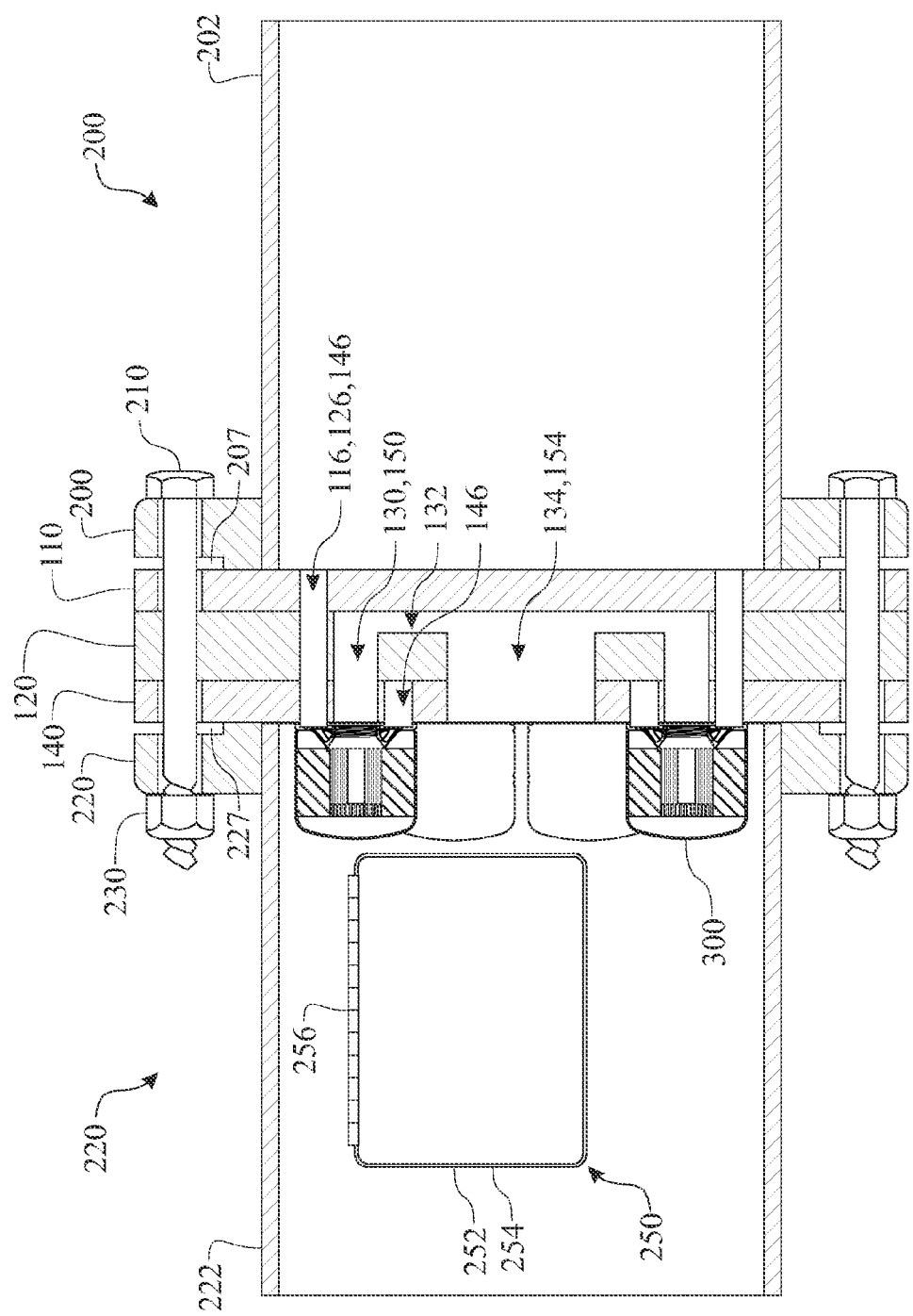
FIG. 4 presents a sectional side view of the assembled exemplary fluid distribution plate assembly shown integrated into the piping system, introducing a plurality of filter assemblies.
Figure 5:
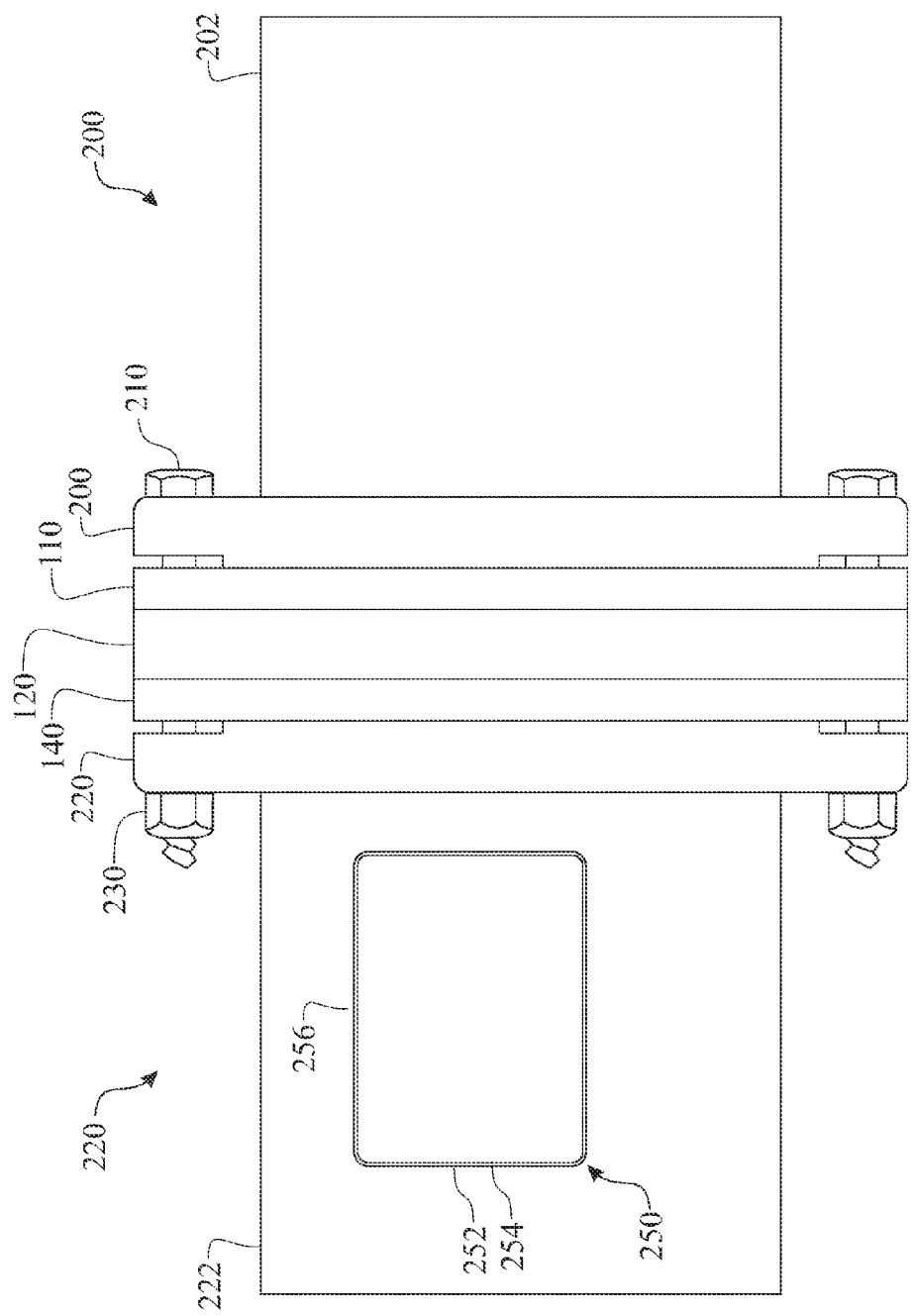
FIG. 5 presents a side view of the assembled exemplary fluid distribution plate assembly shown integrated into the piping system of FIG. 4.
Figure 6:
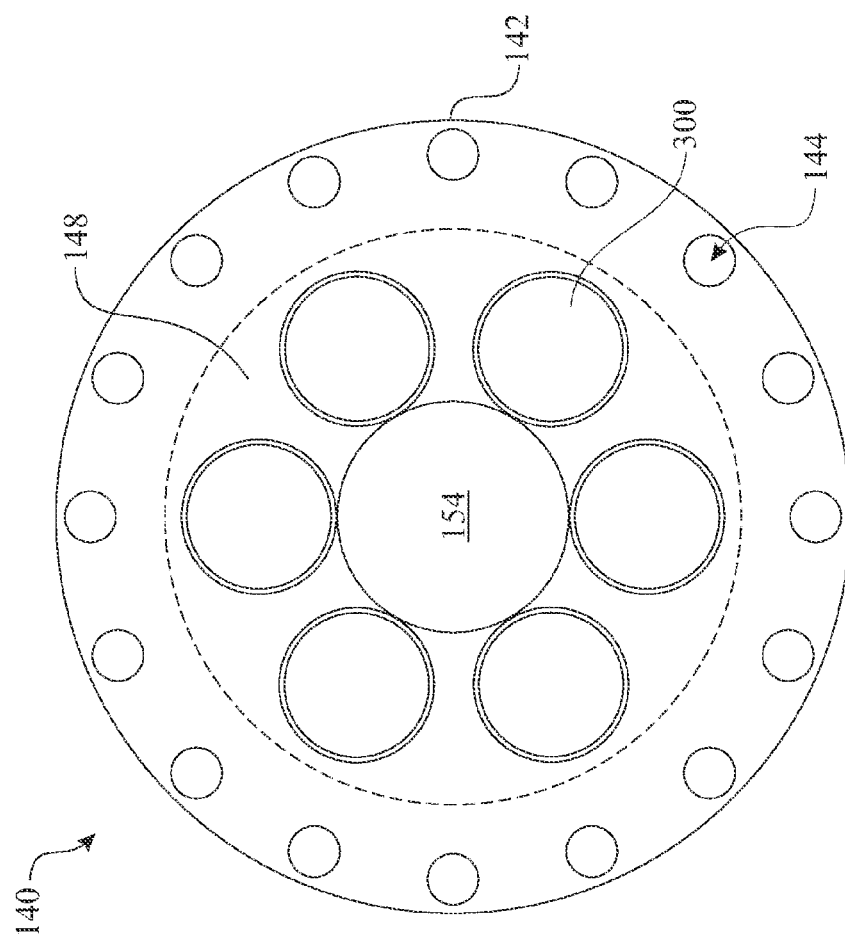
FIG. 6 presents an end view of a filter engagement plate member having a series of filter assemblies attached thereon.
Figure 7:
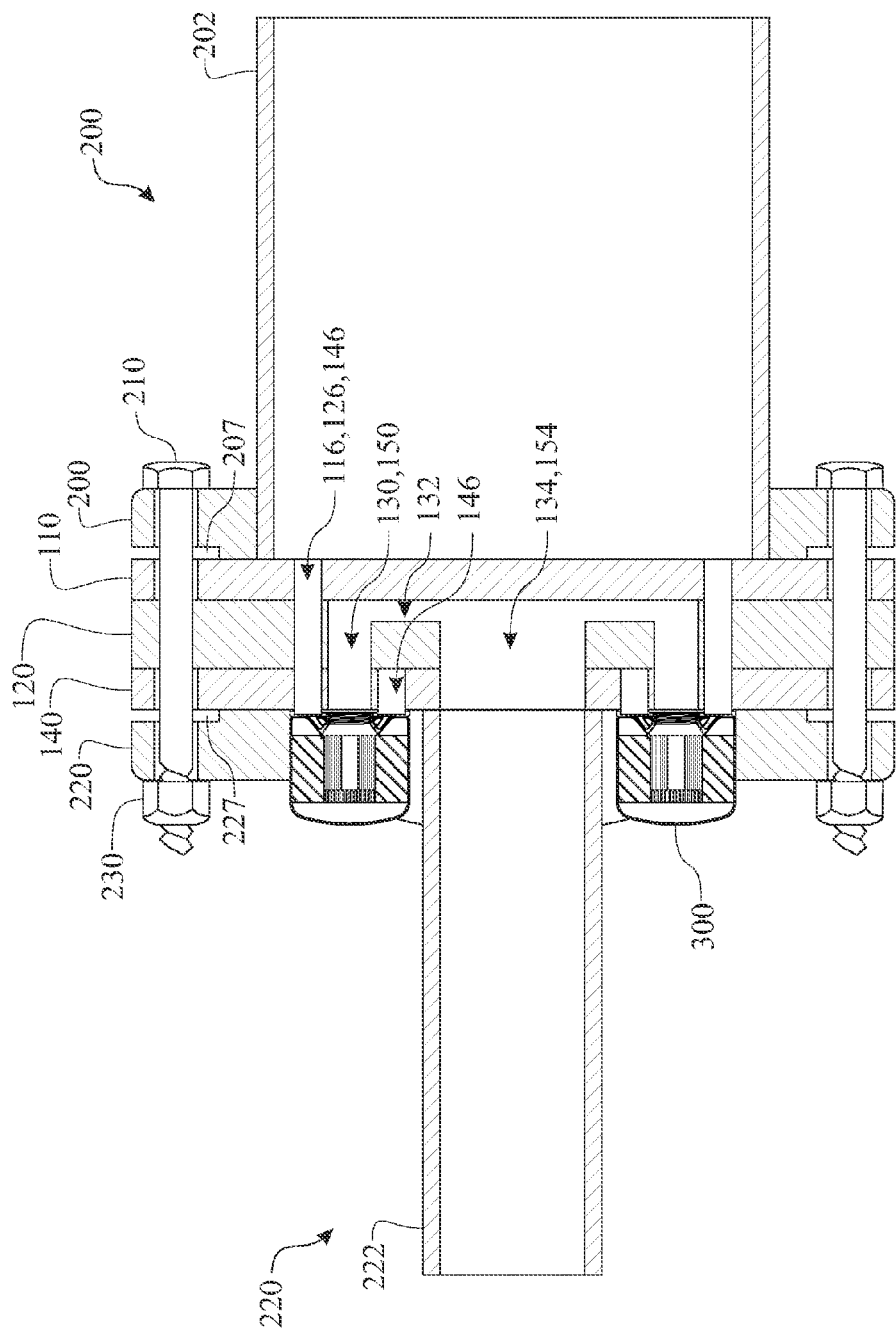
FIG. 7 presents an isometric sectioned view of the enclosed reclamation device previously illustrated in FIG. 6.

The filter assembly 300 can be placed within the downstream pipe 222 as illustrated in FIGS. 4 and 5 or externally as illustrated in FIG. 7. A filter service access door assembly 250 is optionally integrated into the downstream pipe 222, providing access for servicing any or all of the filter assemblies 300. The filter service access door assembly 250 includes a filter service access door 254 hingeably assembled to the downstream pipe 222 via a filter service access door hinge 256. The filter service access door 254 is aligned to a filter service access port 252 formed through the downstream pipe 222. A formed lip is provided about the peripheral edge of the filter service access port 252, wherein the lip overlaps with the edge of the filter service access door 254 providing a seal. Fluid pressure applied to an inside surface of the filter service access door 254 ensures the filter service access door 254 remains sealed when in use.

Alternately, the downstream pipe 222 can be of a reduced diameter, positioning the series of filter assemblies 300 outside of the downstream pipe 222, as illustrated in FIG. 7. This configuration allows the service person to service any or all of the filter assemblies 300. Clearances can be provided in the downstream piping interface flange 220 for each of the filter assemblies 300.

Figure 10:
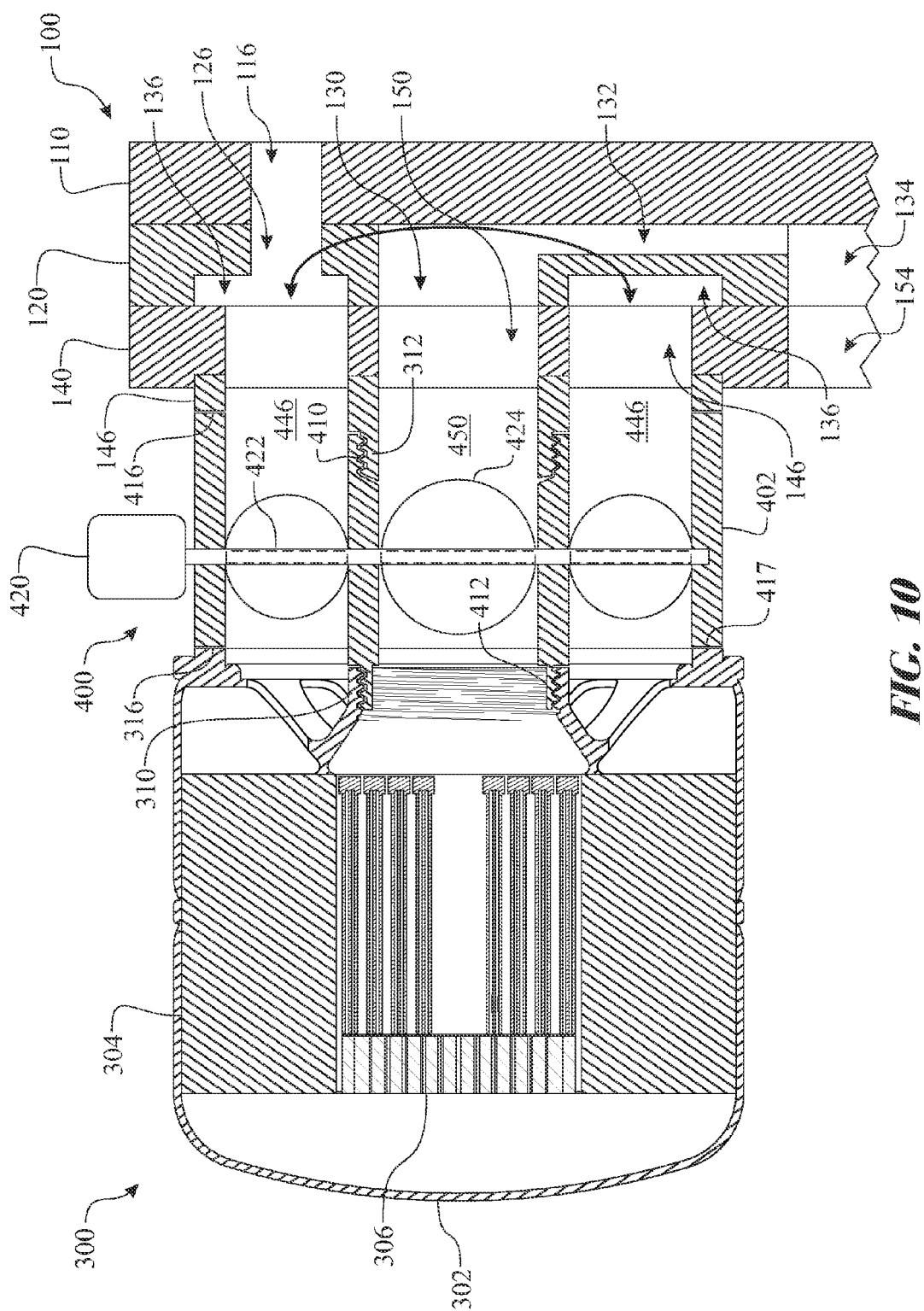
FIG. 10 presents a side sectional view of the exemplary filter assembly introducing a filter control valve assembly.
Figure 11:
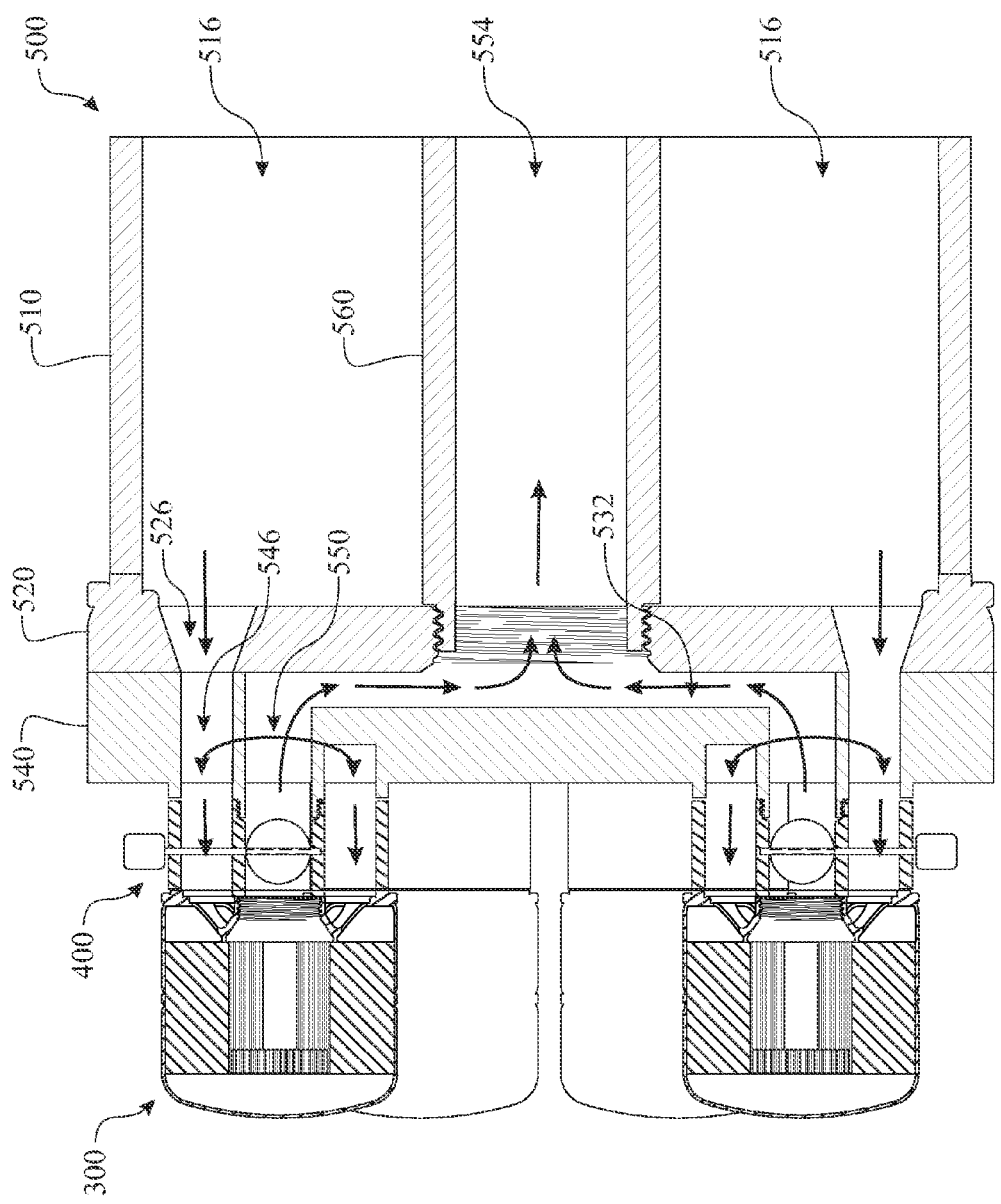
FIG. 11 presents a side sectional view of an alternate embodiment of the present invention, whereby the source fluid is provided and the discharged, reclaimed fluid is discharged on the same side of the fluid distribution plate assembly.

A filter control valve assembly 400 can be inserted between the fluid distribution manifold assembly 100 and each filter assembly 300, as illustrated in FIGS. 10 and 11. The filter control valve assembly 400 can control fluid flow between the fluid distribution manifold assembly 100 and the respective filter assembly 300. This allows the system to operate continuously, while the filter assembly 300 is being serviced. The filter control valve assembly 400 can be of any reasonable form factor, incorporating any well known valve design. The preferred filter control valve assembly 400 comprises a plate connecting end comprising an interface mimicking the filter coupling surface 314 and a filter connecting end comprising an interface mimicking the filter attachment portion of the fluid distribution manifold assembly 100. This provides a seamless assembly process for inserting the filter control valve assembly 400 between the fluid distribution manifold assembly 100 and the filter assembly 300.

The filter control valve assembly 400 includes a control valve housing 402 having a valve coupling 410 and a filter to manifold seal 416 for attachment to and sealing between the filter control valve assembly 400 and the fluid distribution manifold assembly 100 via the filter receiving coupler 312 and filter transfer flow port 146, respectively. Similarly, a filter receiving coupler 412 and valve to filter seal 417 are provided for attachment to and sealing between the filter control valve assembly 400 and the filter assembly 300 via the filter coupling interface 310 and the filter seal 316 respectively. The control valve housing 402 includes two flow channels, an inlet flow port 446 for transferring the fluid to the filter assembly 300 and a reconditioned fluid discharge port 450 for returning the fluid from the filter assembly 300 to the system.

A valve controller 420 operates a valve shaft 422 within the filter control valve assembly 400 to position a series of valve butterflies 424 between an open position and a closed position. In the exemplary embodiment, the valve butterflies 424 are affixed to the valve shaft 422. The valve shaft 422 rotates, positioning the valve butterfly 424 parallel (open) to the flow or perpendicular (closed) to the flow. Sensors (not shown, but well understood) can be included to determine the state of the filtration of each filter assembly 300. A network can monitor the quality of the filtration process. When the monitoring network determines a specific filter assembly 300 is no longer adequately processing the fluid, the network directs the filter control valve assembly 400 to close, diverting the fluid to the remaining, useable filter assembly 300.

Another alternate piping configuration is presented in FIG. 11, wherein the reclaimed fluid is discharged and returned to the system on the same side of the interface as the source fluid. A dual flow direction piping configuration 500 comprises a collected discharge pipe 560 positioned within a source pipe 510, defining two fluid flow conduits. A discharge fluid flow conduit 554 is defined by the collected discharge pipe 560. A source fluid flow conduit 516 is defined between the collected discharge pipe 560 and the source pipe 510. An adapter assembly comprising an intermediate fluid flow plate 520 and a filter engagement plate member 540 can be permanently or removably affixed to the dual flow direction piping configuration 500. A series of intermediate filter transfer flow ports 526 are provided through the intermediate fluid flow plate 520. A filter transfer flow port 546 is provided through the filter engagement plate member 540 positioned in fluid communication with the intermediate filter transfer flow port 526. The filter transfer flow port 546 feeds the source fluid into the filter assembly 300 through the filter control valve assembly 400. The processed fluid then returns into the system via a reconditioned fluid individual return port 550 through the filter engagement plate member 540. The fluid passes through a reconditioned fluid collection passage 532 collecting in the discharge fluid flow conduit 554, wherein the fluid is reintroduced into the system. This configuration allows the service person to service any or all of the filter assemblies 300 without interruption of the fluid reclamation process.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

We claim:

1. An oil reclamation arrangement, the arrangement comprising:
   a series of filter assemblies, each filter assembly having:
      a filter enclosure defined by a fluid encapsulating surface and a filter coupling surface,
      a filtration medium disposed within the filter enclosure,
      at least one filter entrance orifice and a filter discharge orifice provided through the filter coupling surface,
      a filter flow path provided from the at least one filter entrance orifice, through the filtration medium, and exiting through the filter discharge orifice, and
      a filter coupling interface providing mechanical attachment and fluid communication between the filter coupling surface and another object;
   a fluid distribution assembly having:
      a series of filter receiving couplers, the number of filter receiving couplers are respective to the number of filter assemblies, the filter coupler provide the mating connection interface to the filter coupling interface,
      at least one initial conditioning inlet port,
      a series of distribution conduits providing fluid communication between the initial conditioning inlet port and the at least one filter inlet flow port of each filter assembly,
      at least one filter reclamation return port for each filter assembly,
      a series of reclamation collection conduits providing fluid communication between the series of filter reclamation return ports and a reconditioned fluid collection return port, and
      a series of plates assembled together, the plates having a series of ports and passages that form the series of distribution conduits and the series of reclamation collection conduits;
   wherein the series of filter assemblies are removably attached to a filtration side of the fluid distribution assembly via the filter coupling interface.

2. An oil reclamation arrangement as recited in claim 1, the series of plates further comprising:
   an external plate comprising a series of filter inlet transfer ports; and
   a filter engaging plate comprising:
      the series of filter receiving couplers,
      a series of filter transfer ports, each filter transfer port in fluid communication with the respective filter inlet transfer port on one side of the plate and the at least one filter entrance orifice in fluid communication with a respective filter assembly on the opposite side of the plate, a series of reconditioned fluid individual return ports, each reconditioned fluid individual return port being in fluid communication with the filter discharge orifice.

3. An oil reclamation arrangement as recited in claim 2, the series of plates further comprising a reconditioned fluid collection passage formed between the two plates, the reconditioned fluid collection passage providing fluid communication between the series of filter transfer ports and a reconditioned fluid collection return port.

4. An oil reclamation arrangement as recited in claim 3, the arrangement further comprising a series of filter control valve assemblies, each filter control valve assembly being integrated between the filter engaging plate and the respective filter assembly, each filter control valve assembly providing independent flow control to each filter assembly allowing servicing of each filter assembly without interrupting operational flow of a fluid.

5. An oil reclamation arrangement as recited in claim 1, the arrangement further comprising a series of filter control valve assemblies, each filter control valve assembly being integrated between the fluid distribution assembly and the respective filter assembly, each filter control valve providing independent flow control to each filter assembly allowing servicing of each filter assembly without interrupting operational flow of a fluid.

6. An oil reclamation arrangement, the arrangement comprising:
a series of filter assemblies, each filter assembly having:
a filter enclosure defined by a fluid encapsulating surface and a filter coupling surface,
a filtration medium disposed within the filter enclosure,
at least one filter entrance orifice and a filter discharge orifice provided through the filter coupling surface,
a filter flow path provided from the at least one filter entrance orifice, through the filtration medium, and exiting through the filter discharge orifice, and
a filter coupling interface providing mechanical attachment and fluid communication between the filter coupling surface and another object;
a fluid distribution assembly having:
a series of filter receiving couplers, the number of filter receiving couplers are respective to the number of filter assemblies, the filter coupler provide the mating connection interface to the filter coupling interface,
at least one initial conditioning inlet port,
a series of distribution conduits providing fluid communication between the initial conditioning inlet port and the at least one filter inlet flow port of each filter assembly,
at least one filter reclamation return port for each filter assembly,
a series of reclamation collection conduits providing fluid communication between the series of filter reclamation return ports and a reconditioned fluid collection return port, and
a series of plates in a laminated formation, the plates having a series of ports and passages that form the series of distribution conduits and the series of reclamation collection conduits; and
a series of filter control valve assemblies, each filter control valve assembly being integrated between the fluid distribution assembly and a respective filter assembly providing independent flow control to each filter assembly allowing servicing of each filter assembly without interrupting operational flow of a fluid;
wherein the series of filter assemblies are removably attached to a filtration side of the fluid distribution assembly via the filter coupling interface.

7. An oil reclamation arrangement as recited in claim 6, the series of plates further comprising:
an external plate comprising a series of filter inlet transfer ports; and
a filter engaging plate comprising:
the series of filter receiving couplers,
a series of filter transfer ports, each filter transfer port in fluid communication with the respective filter inlet transfer port on one side of the plate and the at least one filter entrance orifice in fluid communication with a respective filter assembly on the opposite side of the plate,
a series of reconditioned fluid individual return ports, each reconditioned fluid individual return port being in fluid communication with the filter discharge orifice.

8. An oil reclamation arrangement as recited in claim 7, the series of plates further comprising a reconditioned fluid collection passage formed between the two plates, the reconditioned fluid collection passage providing fluid communication between the series of filter transfer ports and a reconditioned fluid collection return port.

9. An oil reclamation arrangement as recited in claim 6, wherein the reconditioned fluid collection return port discharge and a source of unconditioned fluid are on a same side of the fluid distribution assembly.

10. An oil reclamation arrangement as recited in claim 6, wherein the reconditioned fluid collection return port discharge and a source of unconditioned fluid are on opposite sides of the fluid distribution assembly.

11. An oil reclamation arrangement as recited in claim 10, the fluid distribution assembly further comprising a mounting flange for insertion between a flange fitting of two adjacent pipe sections.

12. An oil reclamation arrangement, the arrangement comprising:
a fluid distribution assembly comprising:
a plurality of plates assembled in a laminated formation,
a first plate comprising a series of filter inlet transfer ports; and
a second plate comprising:
a series of filter receiving couplers on a filter attachment side of the second plate, each filter coupler providing a mating connection interface to a filter coupling interface of a filter assembly,
a series of filter transfer ports, each filter transfer port in fluid communication with the respective filter inlet transfer port on one side of the plate and the at least one filter entrance orifice for providing fluid communication with a fluid entrance port of a respective filter assembly on the opposite side of the plate,
a series of reconditioned fluid individual return ports, each reconditioned fluid individual return port for providing fluid communication with a filter discharge orifice, and
a series of reclamation collection conduits providing fluid communication between the series of filter reclamation individual return ports and a reconditioned fluid collection return port.

13. An oil reclamation arrangement as recited in claim 12, the series of reclamation collection conduits being provided in a third plate being located between the first and second plates.

14. An oil reclamation arrangement as recited in claim 12, wherein the reconditioned fluid collection return port discharge and a source of unconditioned fluid are on a same side of the fluid distribution assembly.

15. An oil reclamation arrangement as recited in claim 12, wherein the reconditioned fluid collection return port discharge and a source of unconditioned fluid are on opposite sides of the fluid distribution assembly.

16. An oil reclamation arrangement as recited in claim 15, the fluid distribution assembly further comprising a mounting flange for insertion between a flange fitting of two adjacent pipe sections.

17. An oil reclamation arrangement as recited in claim 12, the arrangement further comprising a series of filter control valve assemblies, each filter control valve assembly being integrated between the fluid distribution assembly and the respective filter assembly, each filter control valve providing independent flow control to each filter assembly allowing servicing of each filter assembly without interrupting operational flow of a fluid.

18. An oil reclamation arrangement as recited in claim 12, wherein the at least one filter entrance orifice comprises a series of filter entrance orifices oriented in clusters, each cluster being located respective to a filter assembly.

\* \* \* \* \*